(12) United States Patent
Imbimbo (10) Patent No.: US 8,520,804 B2
(45) Date of Patent: Aug. 27, 2013

(54) LAWFUL INTERCEPTION OF DSS1 BASED VIRTUAL PRIVATE NETWORK

(75) Inventor: Amedeo Imbimbo, Caivano (IT)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1575 days.

(21) Appl. No.: 11/721,792

(22) PCT Filed: Dec. 29, 2004

(86) PCT No.: PCT/SE2004/002048
§ 371 (c)(1),
(2), (4) Date: Jul. 2, 2007

(87) PCT Pub. No.: WO2006/071158
PCT Pub. Date: Jul. 6, 2006

(65) Prior Publication Data
US 2008/0049926 A1    Feb. 28, 2008

(51) Int. Cl.
*H04M 3/22* (2006.01)
(52) U.S. Cl.
USPC .......................................... 379/35; 379/32.01
(58) Field of Classification Search
USPC ............................. 379/32.01–32.04, 35, 133
See application file for complete search history.

(56) References Cited

U.S. PATENT DOCUMENTS

| | | | | |
|---|---|---|---|---|
| 6,498,843 | B1 * | 12/2002 | Cox | 379/207.02 |
| 2002/0051518 | A1 * | 5/2002 | Bondy et al. | 379/35 |
| 2002/0146109 | A1 * | 10/2002 | Sahala | 379/221.15 |
| 2004/0157629 | A1 * | 8/2004 | Kallio et al. | 455/466 |
| 2005/0175156 | A1 * | 8/2005 | Afshar et al. | 379/35 |

* cited by examiner

*Primary Examiner* — Quoc D Tran (57) ABSTRACT

The present invention relates to methods and arrangements in a telecommunication system to generate Interception Related Information IRI related to Virtual Private Network VPN calls, which telecommunication system provides Virtual Private Network services to at least one integrated exchange LE-C; in the system. The exchange LE-C is associated with an Intercept Configuration Unit ICU. The method comprises the following steps:—Sending from the Intercept Configuration Unit ICU to the exchange LE-C, a request REQ to monitor Virtual Private Network calls involving a defined Corporate Network CN-A.—Receiving by the exchange LE-C, a call message SETUP; IAM in Virtual Private Network context comprising an identification field identifying the defined Corporate Network CN-A.—Sending from the exchange LE-C to the Intercept Configuration Unit ICU, Interception Related Information IRI related to the call.

16 Claims, 5 Drawing Sheets

LAWFUL INTERCEPTION OF DSS1 BASED VIRTUAL PRIVATE NETWORK

This application claims the benefit of the International Application Published Under the Patent Cooperation Treaty No. PCT/SE2004/002048, filed Dec. 29, 2004.

TECHNICAL FIELD OF THE INVENTION

The present invention relates to methods and arrangements in a telecommunication system to generate Interception Related Information, related to Virtual Private Network calls.

DESCRIPTION OF RELATED ART

Increasing amount of data traffic as well as real-time communication has lead to a demand for monitoring. One kind of monitoring is lawful interception, i.e. the act of intercepting a communication on behalf of a Law Enforcement Agency. Interception of Content of Communication i.e. speech and data is known. Interception of Intercept Related Information IRI is also known. Intercept Related Information is defined as signaling information related to target subscribers, for example call establishment. As an example, in Circuit Switching domain, the sending of IRI to a monitoring function is triggered by the following call-related and non-call related events:

Call Establishment
Answer
Supplementary Service
Handover
Release
SMS
Location Update
Subscriber Controlled Input Appropriate session related and session unrelated events trigger the sending of IRI to a monitoring function in case of Packet Switching communication.

Beyond the demand for the above types of monitoring, demand for monitoring of IRI involving a Virtual Private Network is desired. A Virtual Private Network VPN is a corporate network defined by means of software within a public network. The VPN function provides a company having geographically dispersed locations with a corporate private network linking those installations. So, while this function offers the company the appearance and functions of a private network, it actually uses the full resources of the public network and private equipments such as Private Branch Exchanges. The public network can support the coexistence of multiple corporate networks in parallel, i.e. multiple corporate networks in parallel share the resources of the public network. Each corporate network should be considered as a separate network. The existing standardized application of public ISDN providing Virtual Private Network services to Private Integrated Services Network Exchanges PINX can be found in the ITU-T recommendation Q.931 (May 1998).

According to current Lawful Interception standards, it is not possible to start the interception of VPN calls and it is not possible to report, by means of existing Intercept Related Information events, the occurrence of Virtual Private Network calls. In case of a Virtual Private Network call a local exchange receiving the call doesn't validate the calling and called party number so a public E.164 (the international public telecommunication numbering plan Recommendation) subscriber cannot be used to start the interception of VPN calls.

SUMMARY OF THE INVENTION

Calling and called party numbers are according to current standards not validated in case of Virtual Private Network calls. The present invention relates to problems how to intercept Virtual Private Network calls where calling and called party numbers only have a private significance.

The problems are solved by the invention by introducing a new target type for interception, allowing a Lawful Enforcement Agency to monitor Virtual Private Network calls to and from any premises of a certain defined corporate network.

More in detail, the problems are solved by methods and arrangements in a telecommunication system to generate Interception Related Information related to Virtual Private Network calls. The telecommunication system provides Virtual Private Network services to at least one integrated exchange in the system. The at least one exchange is associated with an Intercept Configuration Unit. The method comprises the following steps:

Sending from the Intercept Configuration Unit to the exchange, a request to monitor Virtual Private Network calls involving a defined Corporate Network.

Receiving by the exchange, a message in Virtual Private Network context comprising an identification field identifying the defined Corporate Network.

Sending from the exchange to the Intercept Configuration Unit, Interception Related Information related to the call involving the defined Corporate Network.

Advantages with the invention are:

Possibility to provide Lawful Interception Agencies with accurate information related to Virtual Private Network calls.

Interception cases foreseen by the standards are fulfilled by the invention.

The invention will now be described more in detail with the aid of preferred embodiments in connection with the enclosed drawings.

DETAILED DESCRIPTION OF EMBODIMENTS

Figure 1:
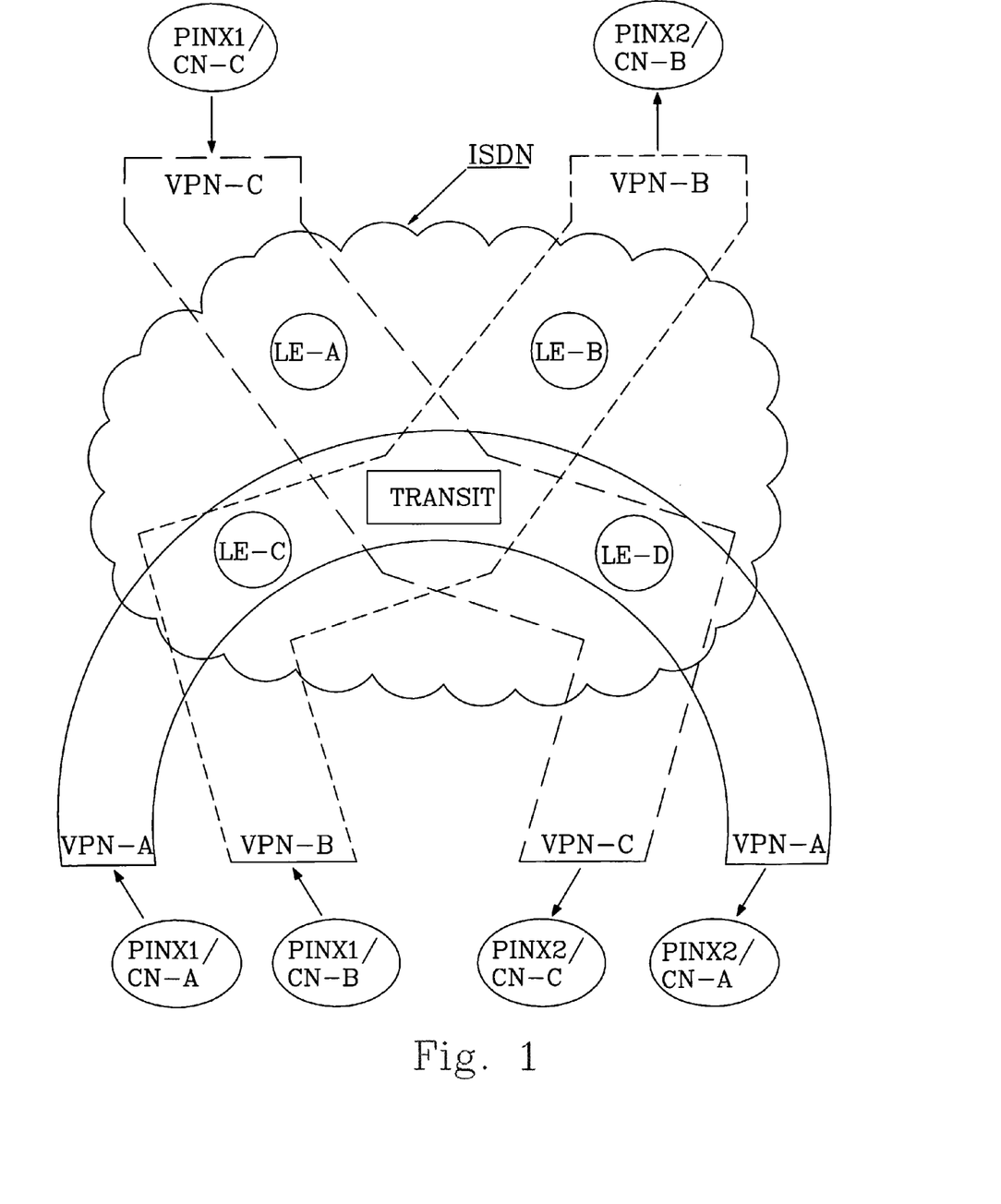
FIG. 1 discloses a block schematic illustration of a telecommunication system comprising a public network that is used as transit network by several corporate networks.

FIG. 1 discloses a public Integrated Services Digital Network ISDN that is used by Corporate Networks CN-A, CN-B and CN-C as a transit network. The ISDN comprises Private Integrated Network exchanges PINX. A PINX is a nodal entity within a private integrated services network providing switching capabilities and private telecommunication services to the users of a corporate network CN the PINX is a part of. A PINX is either a physical Private Automatic Branch exchange within the corporate premises or an emulation of a Private Automatic Branch exchange for what concerns switching and services provision capabilities within the public network. Different physical PINX can be seen in FIG. 1 such as PINX1/CN-A, PINX2/CN-A, PINX1/CN-B, PINX2/CN-B, PINX1/CN-C, PINX2/CN-C. Different emulated PINX can also be seen in FIG. 1 within the public network, such as local exchanges LE-A, LE-B, LE-C, LE-D and a transit exchange TRANSIT. If the public ISDN exchanges have transit PINX functionality and the network supports transit PINX functionality, it is possible for a corporate network CN to use the public ISDN as an interconnecting network between the physical exchanges. In this example the public ISDN supports Virtual Private Network VPN. A Virtual Private Network is a corporate network defined by means of software within the public network. A Digital Subscriber signaling System No. 1 DSS1 based Virtual Private Network VPN function provides a closed group of subscribers with a virtual private network. The DSS1 based VPN function provides a company having geographically dispersed locations with a corporate private network linking those installations. So, while this function offers the company the appearance and functions of a private network, it actually uses the full resources of the public network and private equipments such as private branch exchanges. VPN calls are set up, controlled and cleared through DSS1 protocol procedures. The application of a public ISDN providing Virtual Private Network context at a T reference point of a public ISDN can be found in the ITU-T Recommendation Q.931 (May 1998). In FIG. 1, a first Virtual Private Network VPN-A is part of the public ISDN and links PINX1/CN-A and PINX2/CN-A together. VPN-A comprises the emulated local exchanges LE-C and LE-D in the ISDN network. A second Virtual Private Network VPN-B links PINX1/CN-B and PINX2/CN-B together. VPN-B comprises the local exchanges LE-B and LE-C. A third Virtual Private Network VPN-C links PINX1/CN-C and PINX2/CN-C together. VPN-C comprises the local exchanges LE-A and LE-D. All Virtual Private Networks VPN-A, VPN-B and VPN-C share the transit exchange TRANSIT in the ISDN network.

Figure 2:
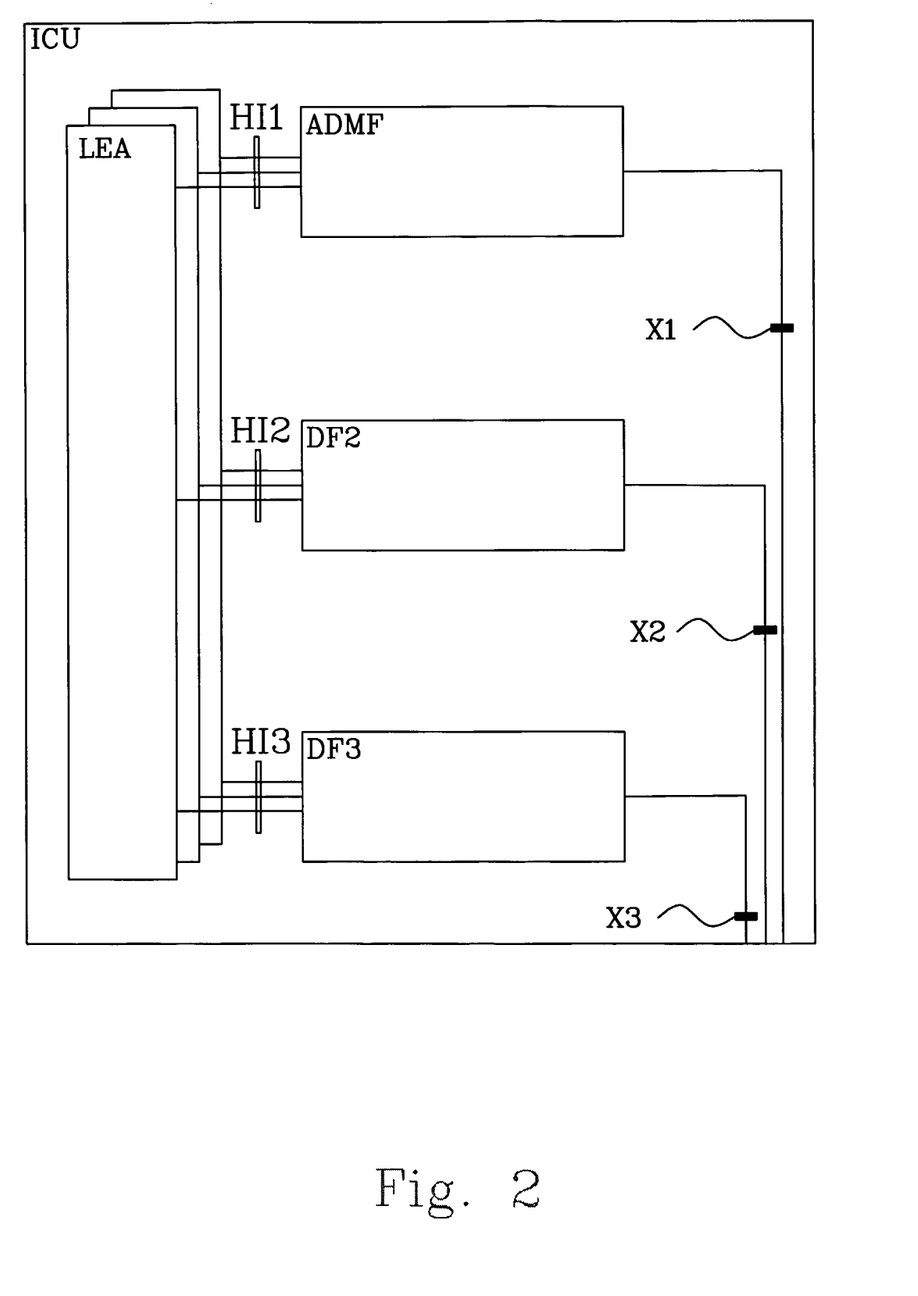
FIG. 2 discloses a block schematic illustration of an Intercept Configuration Unit in the telecommunication system.

An Intercept Configuration Unit ICU is disclosed in FIG. 2. The ICU comprises at least one Law Enforcement Agency LEA (three blocks representing different LEAs are shown in FIG. 2). Each LEA is connected to three Mediation Functions respectively for ADMF, DF2, DF3 i.e. an Administration Function ADMF and two Delivery Functions DF2 and DF3. The Administration Function and the Delivery Functions are each one connected to the LEA via standardized interfaces HI1-HI3, and connected to the telecommunication network via the interfaces X1-X3. The ADMF is connected via the interfaces HI1/X1 while DF2 is connected via HI2/X2 and DF3 is connected via HI3/X3. The Administration Function ADMF is together with the delivery functions used to hide from the network that there might be multiple activations by the different Law Enforcement Agencies. The messages sent from LEA to ADMF via HI1 and from the ADMF to the network via the X1 interface comprise identities of the subscriber/equipment that is to be monitored, i.e. target identities. The Delivery Function DF2 receives Intercept Related Information IRI from the network via the X2 interface and DF2 is used to distribute the IRI to relevant Law Enforcement Agencies via the HI2 interface. The Delivery Function DF3 receives Content of Communication CC, i.e. speech and data, and is used to distribute the CC to relevant LEAs via the HI3 interface. DF3 is responsible for call control signaling and bearer transport for an intercepted product. Intercept Related Information IRI, received by DF2, which also are called Events, are either call related or non-call related. Intercept Related Information IRI is defined as signaling information related to targets. Call establishment is an example of a call related event and Location Update is an example of a non-call related event.

Figure 3:
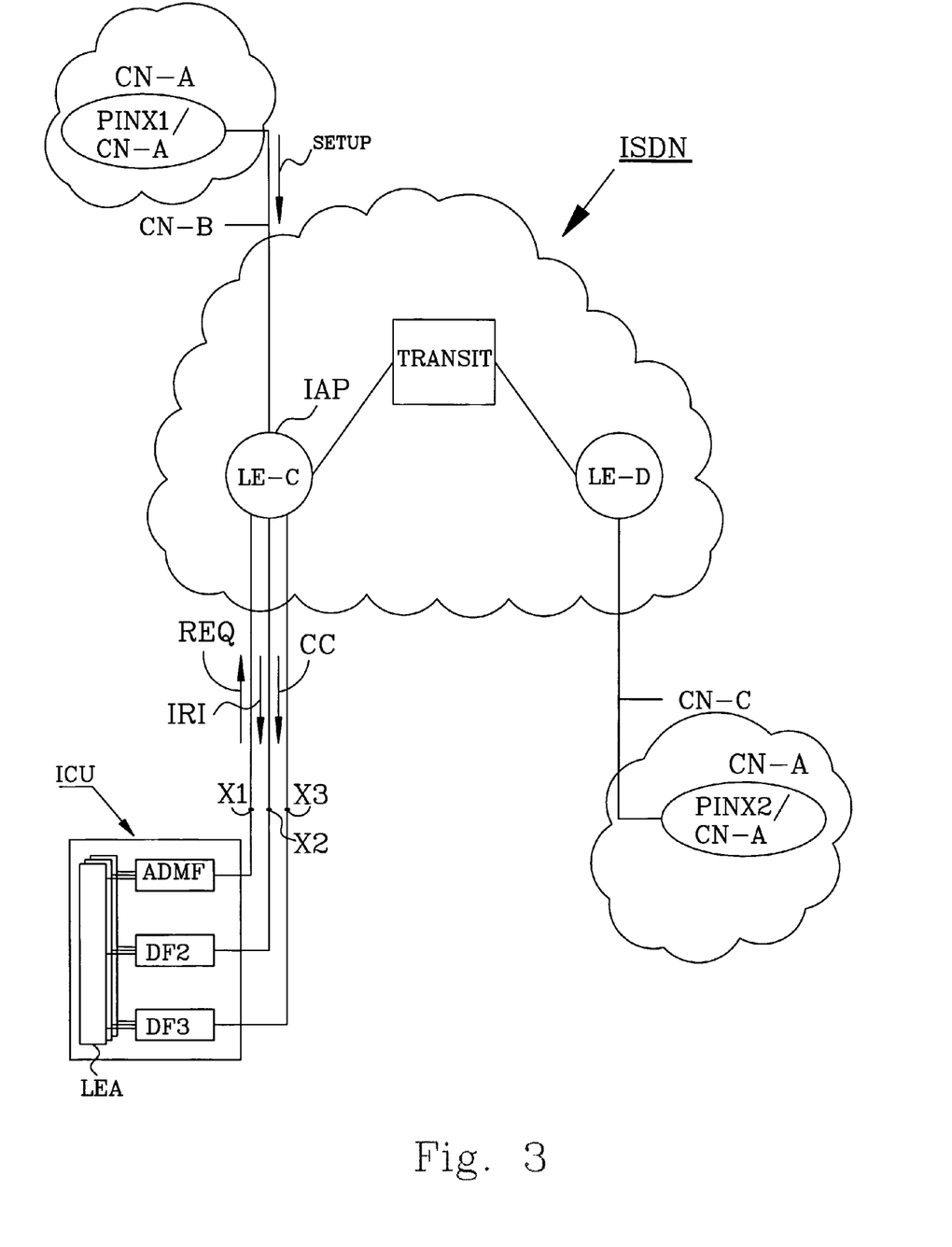
FIG. 3 discloses a block schematic illustration of an Intercept Configuration Unit connected to an emulated originating exchange in a public network used by a corporate network as transit network. Interception Related Information as well as Content of Communication is intercepted in the shown illustration.

FIG. 3 discloses in a first embodiment of the invention some of the parts that have been explained earlier in FIG. 1 and 2. Interception of a DSS1 based VPN call when an emulated originating PINX, i.e. LE-C, is used as Intercept Access point IAP, will now be explained. FIG. 3 discloses those parts of the ISDN network that are used when a call is set-up between the physical exchanges PINX1/CN-A and PINX2/CN-A and when the public ISDN network is used as transit network. The local exchange LE-C acts in this embodiment as the emulated originating PINX while the local exchange LE-D act as an emulated terminating PINX. LE-C and LE-D are associated to each other via the transit exchange TRANSIT. The Intercept Configuration Unit ICU is connected to the local exchange LE-C via the interfaces X1-X3. The local exchange LE-C hereby acts as an Interception Access Point IAP. In this embodiment also interception of other IRIs and Content of Communication CC is briefly explained.

A method to intercept a DSS1 based VPN call according to the first embodiment will now be explained more in detail. The method comprises the following steps:

The Law Enforcement Agency LEA sends a request to the Administration Function ADMF to activate interception of Virtual Private Network calls involving the Corporate Network CN-A. It is to be observed that when ADMF sends a request to intercept a certain Corporate Network, any originating and terminating VPN call using this network is intercepted.

The ADMF forwards the request REQ via the interface X1 i.e. the ADMF forwards a target identity of the Corporate Network CN-A to the Intercept Access Point IAP, i.e. to the Local Exchange LE-C.

A call set-up message SETUP is sent from the physical originating PINX1/CN-A in the Corporate Network CN-A to the emulated Local exchanges LE-C and a call is set-up to the physical terminating PINX2/CN-A in CN-A via the emulated Local exchanges LE-C, TRANSIT and LE-D in the ISDN network. The SETUP message comprises a VPN indicator information element. The VPN indicator information element indicates that the message is in Virtual Private Network context. The VPN indicator information element includes a Corporate Network indicator CNIND saying that the call is network specific. A Corporate Network Identifier CNID in the set-up message identifies the corporate network to be the Corporate Network CN-A.

The local exchange LE-C registers that the SETUP message is in Virtual Private Network context.

The local exchange LE-C compares the target identity received from the ICU, i.e. CN-A, with the corporate network identified in the Corporate Network Identifier CNID received in the SETUP message, i.e. CN-A. LE-C finds conformity.

The local exchange LE-C forwards Intercept Related Information IRI to the Law Enforcement Agency LEA via the delivery function DF2. The IRI contains for the CN identifier target identity CN-A, all the information now provided for the ISDN call in public context, including the calling and called party number that may have only private significance.

The sequence of other IRIs (e.g. related to alerting, connection and release events) in any traffic case and the call content is intercepted as a normal public call by requesting desired monitoring from the ICU via the X1 interface and by receiving the requested IRI and/or the Content of Communication to the ICU via the X2 and/or X3 interface.

As an alternative to the above method, the Corporate Network indicator CNIND in the VPN indicator information element included in the SETUP message, may comprise "no indication" meaning that the call belongs to an assigned default Corporate Network. The Corporate Network Identifier CNID in the set-up message is then not used. To be able to handle this case a further method step that assigns a default Corporate Network has to be included in the above method. When "no indication" is given in the VPN indicator, the LE has a default CNID to use for that call (e.g. a default CNID is assigned to a particular ISDN Primary Rate Access). As consequence, only a unique CNID can be assigned to an access, so two CNs cannot share the same access. So the target id is compared with this default CNID, instead. As yet another alternative, the Corporate Network indicator CNIND may indicate "global" meaning that the call belongs to a Corporate Network having a globally unique value. The Corporate Network Identifier CNID in the set-up message hereby identifies the corporate network. When the CNIND is set to "global", the CNID contains the binary representation of the Corporate Network CN identifier. The CN identifier starts with the Binary Coded Decimal representation of the E.164 country code digits of the country where the Corporate Network was initially assigned. The remainder of the CN identifier is country specific.

Figure 4:
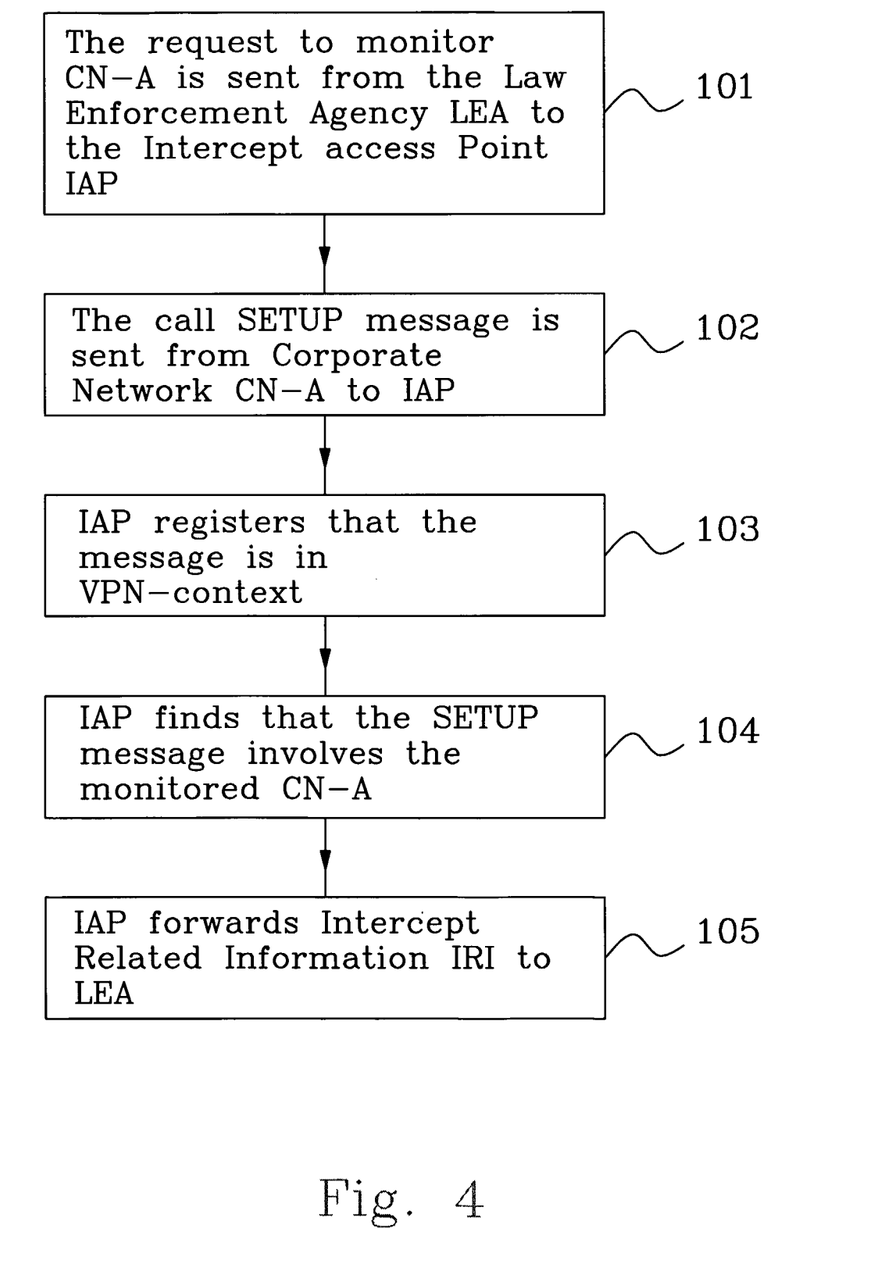
FIG. 4 discloses a flow chart illustrating some essential method steps of the invention.

FIG. 4 discloses a flowchart in which some of the more important steps are shown. The flowchart is to be read together with the earlier shown figures. The flowchart comprises the following steps:

The ADMF forwards the request REQ comprising a target identity of the Corporate Network CN-A from the Law Enforcement Agency LEA to the Intercept Access Point IAP. A block 101 discloses this step in FIG. 4.

A call set-up message SETUP is sent from the physical originating PINX1/CN-A in the Corporate Network CN-A to the emulated Local exchanges LE-C. The SETUP message comprises a VPN indicator information element. A block 102 discloses this step in FIG. 4.

The local exchange LE-C registers that the SETUP message is in Virtual Private Network context. A block 103 discloses this step in FIG. 4.

The local exchange LE-C compares the target identity received from the ICU, i.e. CN-A, with the corporate network identified in the Corporate Network Identifier CNID received in the SETUP message or with the default CNID, i.e. CN-A. LE-C finds conformity. A block 104 discloses this step in FIG. 4.

The local exchange LE-C forwards Intercept Related Information IRI to the Law Enforcement Agency LEA. A block 105 discloses this step in FIG. 4.

Figure 5:
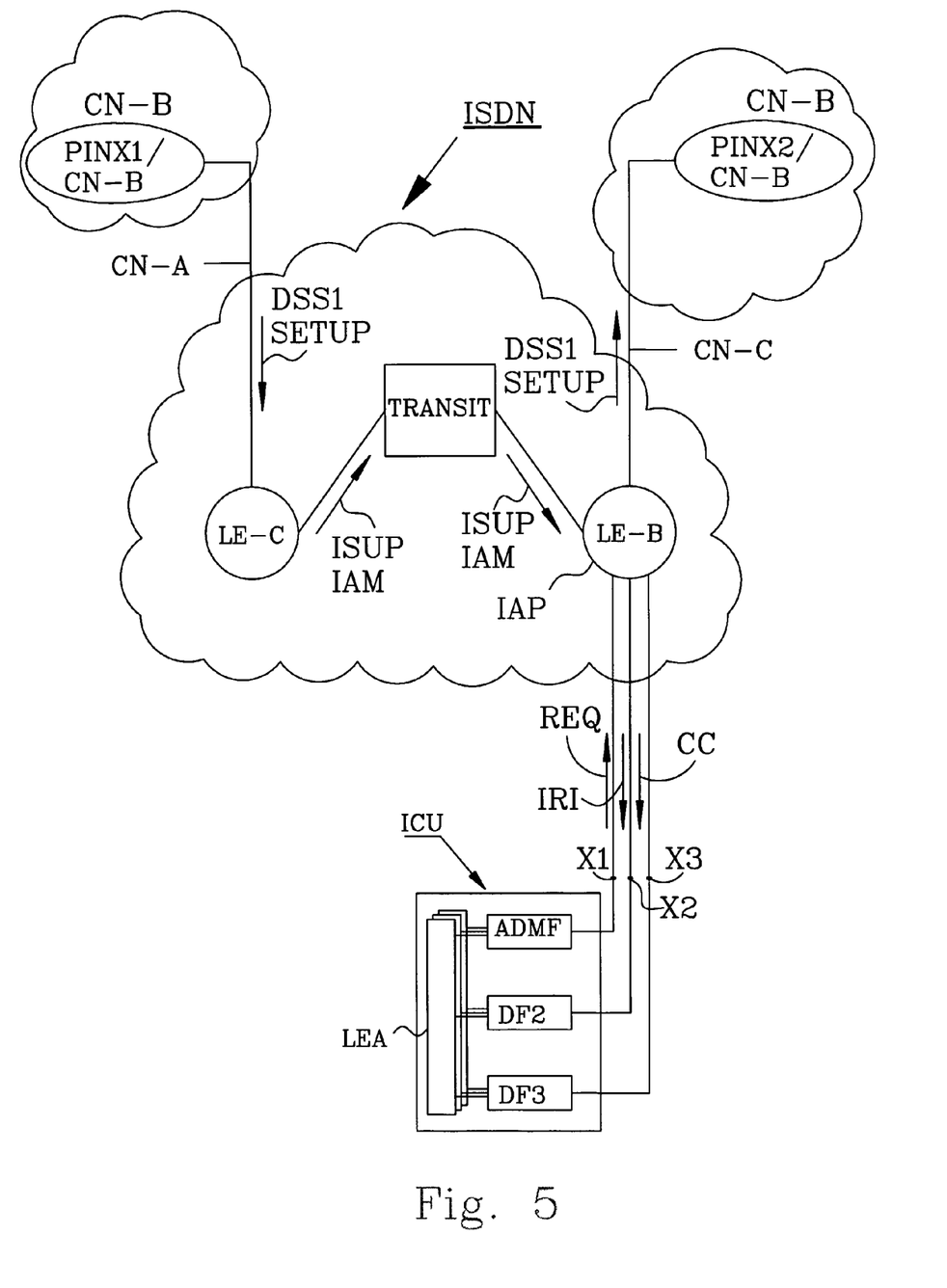
FIG. 5 discloses a block schematic illustration of an Intercept Configuration Unit connected to an emulated terminating exchange in a public network used by a corporate network as transit network.

In FIG. 5 a second embodiment of the invention is disclosed. Interception of a DSS1 based VPN call when using an emulated terminating PINX, as Intercept Access point IAP will now be explained. FIG. 5 discloses those parts of the ISDN network that are used when a call is set-up between the physical exchanges PINX1/CN-B and PINX2/CN-B and when the publics ISDN network is used as transit network. The local exchange LE-C acts in this embodiment as an emulated originating PINX while the local exchange LE-B act as the emulated terminating PINX. LE-C and LE-B are associated to each other via the transit exchange TRANSIT. The Intercept Configuration Unit ICU is connected to the local exchange LE-B via the interfaces X1 and X2 and X3. The local exchange LE-B hereby acts as an Interception Access Point IAP.

A method to intercept a DSS1 based VPN call according to the second embodiment will now be explained more in detail. The method comprises the following steps:

The Law Enforcement Agency LEA sends a request to the Administration Function ADMF to activate interception of Virtual Private Network calls involving the Corporate Network CN-B.

The ADMF forwards the request REQ via the interface X1, i.e. the ADMF forwards a target identity of the Corporate Network CN-B to the Intercept Access Point IAP, i.e. to the Local Exchange LE-B.

A call set-up message SETUP is sent from the physical originating PINX1/CN-B in the Corporate Network CN-B to the emulated Local exchanges LE-C and a call is set-up to the physical terminating PINX2/CN-B via the emulated Local exchanges LE-C, TRANSIT and LE-B in the ISDN network. The DSSl SETUP message is sent between the physical originating PINX1/CN-B and the emulated Local exchange LE-C and between the local exchange LE-B and the physical terminating PINX2/CN-B. Between two emulated Local exchanges or a Local Exchange and the transit exchange an ISUP IAM is sent. The Initial Address Message IAM is hereby sent from TRANSIT to LE-B. The IAM message comprises a VPN indicator information element. The VPN indicator information element indicates that the message is in Virtual Private Network context. The VPN indicator information element includes a Corporate Network indicator CNIND saying that the call is network specific. A Corporate Network Identifier CNID in the set-up message identifies the corporate network to be the Corporate Network CN-B.

The emulated Local exchanges LE-B registers that the Initial Address Message IAM message is in Virtual Private Network context.

The exchange LE-B compares the target identity received from the ICU, i.e. CN-B, with the corporate network identified in the Corporate Network Identifier CNID received in the IAM message, i.e. CN-B. LE-B finds conformity.

The exchange LE-B forwards Intercept Related Information IRI to the Law Enforcement Agency LEA via the delivery function DF2. The IRI contains for the CN identifier target identity CN-A all the information now provided for the ISDN call in public context, including the calling and called party number that may have only private significance. As in the first embodiment, the sequence of other IRIs (e.g. related to alerting, connection and release events) in any traffic case and the call content can be intercepted as a normal public call by requesting from the ICU desired monitoring via the X1 interface and by receiving the requested IRI and/or the CC via the X2 and/or X3 interface.

Different variations are possible within the scope of the invention. To be noted is for example that a physical exchange can be used as gateway exchange and support multiple Corporate Networks. Thus the mechanism for identifying a Corporate Network needs to be conveyed between a physical exchange and the public network. It is of course also possible to have two or more transit exchanges involved in a VPN call as well having a unique LE involved in a VPN call if the involved PINX are connected to the same LE. The invention is in other words not limited to the above described and in the drawings shown embodiments but can be modified within the scope of the enclosed claims.

The invention claimed is:

1. A method in a telecommunication system to generate Interception Related Information related to Virtual Private Network calls, which telecommunication system provides Virtual Private Network services to at least one integrated exchange in the system, wherein the exchange is associated with an Intercept Configuration Unit, which method comprises the steps of:
   sending from the Intercept Configuration Unit to the integrated exchange, a request to monitor all Virtual Private Network calls to and from any premises of a certain defined Corporate Network;
   receiving by the integrated exchange, a call message in Virtual Private Network context comprising an identification field identifying the defined Corporate Network, and
   sending from the integrated exchange to the Intercept Configuration Unit, Interception Related Information related to the call.

2. The method in a telecommunication system according to claim 1 which method further comprises the steps of:
   sending from the Intercept Configuration Unit to the integrated exchange, a request to intercept Content of Communication related to the call; and
   sending from the integrated exchange to the Intercept Configuration Unit, Content of Communication related to the call.

3. The method in a telecommunication system according to claim 1, which method further comprises the step of assigning a default Corporate Network to be selected for the call and used in case no identification of a Corporate Network exists in the identification field.

4. The method in a telecommunication system according to claim 3, wherein the default Corporate Network is assigned to a particular ISDN Primary Rate Access.

5. The method in a telecommunication system according to claim 1 wherein the Virtual Private Network call is set-up between a first physical exchange and a second physical exchange via the system, which first and second exchanges are connected to the same emulated exchange in the system.

6. The method in a telecommunication system according to claim 1 whereby a Virtual Private Network call is set-up, controlled and cleared through Digital Subscriber Signaling System No. 1. protocol procedures.

7. The method in a telecommunication system according to claim 1 whereby a Virtual Private Network call is set-up, controlled and cleared through Digital Subscriber Signaling System No. 1. and ISDN User Part protocol procedures.

8. The method in a telecommunication system according to claim 1, whereby the at least one integrated exchange is an originating exchange and whereby the call message is received by the originating exchange from a physical exchange which exchange is a gateway exchange used by different corporate networks.

9. An arrangement in a telecommunication system to generate Interception Related information related to Virtual Private Network calls, which telecommunication system provides Virtual Private Network services to at least one integrated exchange in the system, wherein the integrated exchange is associated with an Intercept Configuration Unit, which arrangement comprises:
   means for sending from the Intercept Configuration Unit to the integrated exchange, a request to monitor all Virtual Private Network calls to and from any premises of a certain defined Corporate Network;
   means for receiving by the integrated exchange, a call message in Virtual Private Network context comprising an identification field identifying the defined Corporate Network, and
   means for sending from the integrated exchange to the Intercept Configuration Unit, Interception Related Information related to the call.

10. The arrangement in a telecommunication system according to claim 9, which arrangement further comprises:
    means for sending from the Intercept Configuration Unit to the exchange, a request to intercept Content of Communication related to the call; and
    means for sending from the exchange to the Intercept Configuration Unit, Content of Communication related to the call.

11. The arrangement in a telecommunication system according to claim 9, which arrangement further comprises a means for assigning a default Corporate Network to be selected for the call and used in case no identification of a Corporate Network exists in the identification field.

12. The arrangement in a telecommunication system according to claim 11, wherein the default Corporate Network is assigned to a particular ISDN Primary Rate Access.

13. The arrangement in a telecommunication system according to claim 9, wherein the Virtual Private Network call is set-up between a first physical exchange and a second physical exchange via the system, which first and second exchanges are connected to the same emulated exchange in the system.

14. The arrangement in a telecommunication system according to claim 9, wherein a Virtual Private Network call is set-up, controlled and cleared through Digital Subscriber Signaling System No. 1 protocol procedures.

15. The arrangement in a telecommunication system according to claim 9 wherein a Virtual Private Network call is set-up, controlled and cleared through Digital Subscriber Signaling System No. 1. and ISDN User Part protocol procedures.

16. Arrangement in a telecommunication system according to claim 9, wherein the at least one integrated exchange is an originating exchange and whereby the call message is received by the originating exchange from a physical exchange which exchange is a gateway exchange used by different corporate networks.

* * * * *

UNITED STATES PATENT AND TRADEMARK OFFICE
CERTIFICATE OF CORRECTION

PATENT NO. : 8,520,804 B2  
APPLICATION NO. : 11/721792  
DATED : August 27, 2013  
INVENTOR(S) : Imbimbo Page 1 of 1

It is certified that error appears in the above-identified patent and that said Letters Patent is hereby corrected as shown below:

On the Title Page, in Column 1, in Item (51), under "Int. Cl.", insert -- H04M 1/24 (2006.0) H04M 3/08 (2006.0) --.

In the Claims

In Column 7, Line 18, in Claim 1, delete "Network," and insert -- Network; --, therefor.

In Column 7, Line 47, in Claim 6, delete "No. 1." and insert -- No. 1 --, therefor.

In Column 7, Line 51, in Claim 7, delete "No. 1." and insert -- No. 1 --, therefor.

In Column 8, Line 14, in Claim 9, delete "Network," and insert -- Network; --, therefor.

In Column 8, Line 50, in Claim 15, delete "No. 1." and insert -- No. 1 --, therefor.

In Column 8, Line 52, in Claim 16, delete "Arrangement" and insert -- The arrangement --, therefor.

Signed and Sealed this  
Thirty-first Day of December, 2013

Margaret A. Focarino  
*Commissioner for Patents of the United States Patent and Trademark Office*